United States Patent [19]

Smith, Jr. et al.

[11] 4,150,900
[45] Apr. 24, 1979

[54] SLURRY MIXER

[75] Inventors: Dean L. Smith, Jr., Mountainside; Barry L. Tarmy, Berkeley Heights, both of N.J.

[73] Assignee: Exxon Research & Engineering Co., Florham Park, N.J.

[21] Appl. No.: 838,558

[22] Filed: Sep. 30, 1977

[51] Int. Cl.² .............................................. B01F 7/16
[52] U.S. Cl. .................................................. 366/302
[58] Field of Search ............... 366/302, 307, 264, 266, 366/262, 241, 244, 247, 249, 250, 251, 252

[56] References Cited

U.S. PATENT DOCUMENTS

| | | | |
|---|---|---|---|
| 2,159,856 | 5/1939 | MacLean | 366/307 |
| 2,491,656 | 12/1949 | Goldman | 366/302 |
| 2,757,909 | 8/1956 | Wayne | 366/307 |
| 3,339,897 | 9/1967 | Davis | 366/266 X |
| 3,532,327 | 10/1970 | Landberg | 366/307 |

*Primary Examiner*—Edward J. McCarthy

*Attorney, Agent, or Firm*—F. Donald Paris

[57] ABSTRACT

A mixing system which prevents accumulation of buoyant stagnant particles on the liquid surface and produces substantially uniform outlet slurry concentrations, comprising a tank having partial baffles in combination with an agitator. The baffle designs may be suitable for variable or constant level tanks depending upon the particular design selected and basically includes a plurality of baffles located within the tank substantially at or just below the liquid surface. These baffles are spaced about the tank wall and for a constant level agitated tank can be secured to the wall at a fixed location. In the case of variable level tanks the baffles can be maintained at the desired location by means of a floating member.

Another embodiment locates the baffles as mentioned above and further provides a centrally located draft tube located above the agitator. Still another embodiment for variable level tanks locates narrow fixed baffles extending substantially from the liquid surface to the bottom of the tank.

19 Claims, 7 Drawing Figures ically have employed full baffles, i.e. baffles which extend for the full length of the tank walls at spaced locations. A typical fully-baffled mixing tank normally comprises four full length wall baffles each of which has a radial width of 1/10 to 1/12 of the tank diameter. This type of full baffling eliminates tank swirl and vortex formation, except when the liquid surface is very close to the top of an agitator.

SLURRY MIXER

BACKGROUND OF THE INVENTION

The present invention relates to mixing of buoyant particle slurries and more particularly to baffle designs for incorporation into mixing tanks which accomplishes the same.

Generally the effective mixing of buoyant particle slurries is very important to many process operations, for example, in the manufacture of elastomers. In the later process, synthesized polymer particles are fed to finishing sections as water slurry and holding tanks are then used to receive the slurry and supply it as uniform feed to product extruders. The mixing of these buoyant particles also is an important operation during other aspects of chemical manufacture, such as during the dissolving of polymer particles in processing lubricating oil additives. Heretofore, good mixing has not always been achieved and often times stagnant particles can agglomerate on the liquid surface which can cause system shutdowns. Another problem is that where the feed concentration is related to the tank level, then the receiver of the feed can be severely affected if the tank level significantly changes. Thus, it is clearly desirable and essential to have an effective buoyant particle mixing system which will prevent accumulation of stagnant particles at liquid surfaces and produce continuous flow outlet from the holding tanks at a concentration which does not vary significantly with changes in the tank liquid level.

Previous attempts have included employing holding tanks which are unbaffled and having a central vortex to provide the desired mixing. However, it has been found that various deficiencies exist in unbaffled tanks including the need for higher mixing speeds than normally anticipated; concentration of particles between the bottom of the vortex and top of the vortex-creating turbine, and undesirable surface waves at certain mixer speeds, especially in larger holding tanks.

Present mixing designs which include baffling typically have employed full baffles, i.e. baffles which extend for the full length of the tank walls at spaced locations. A typical fully-baffled mixing tank normally comprises four full length wall baffles each of which has a radial width of 1/10 to 1/12 of the tank diameter. This type of full baffling eliminates tank swirl and vortex formation, except when the liquid surface is very close to the top of an agitator.

Other prior art illustrative of employing full length baffles including U.S. Pat. Nos. 706,473 and 2,628,801. Still further mixing arrangements wherein the baffles are situated other than at or just below the liquid surface are disclosed in U.S. Pat. Nos. 1,353,166; 2,031,590; and 3,660,244 all of which suggest or disclose locating the baffles at or near the bottom of the tank. U.S. Pat. No. 2,143,652 discloses the location of the top baffles at the center of the tank and no vortex is formed. The latter expedient also is taught by U.S. Pat. No. 3,414,240 which discloses a vertically arranged finger baffle structure for suppressing vortices but which still results in a modified central vortex. U.S. Pat. No. 3,473,790 discloses centrally located annular baffles about the agitator at the liquid surface for intercepting flow from the agitator above the liquid surface directing it down without forming a vortex. Those patents which are typical of unbaffled arrangements are U.S. Pat. Nos. 905,025; 1,771,321; 2,042,818; 2,831,418; and 2,875,897, all of which result in undesirable regions of relatively high particle concentration within the mixing vessel. Those baffle arrangements which suppress or eliminate vortex formation can be found in U.S. Pat. Nos. 706,473; 1,353,166; 1,354,489; 1,756,236; 2,031,590; 2,628,081; 2,928,665; and 3,473,790; however, this type of arrangement makes particle removal from the liquid surface difficult.

SUMMARY OF THE INVENTION

The present invention relates to an improved mixing system which provides uniform mixing without excessive consumption of mixing energy and more particularly, to a mixing system which employs partial baffling to accomplish sufficient buoyant particle mixing.

According to the present invention, it has been found that the location of finger baffles (also herein called partial baffles) of suitable configuration, e.g. rectangular, triangular, etc., positioned at or just below the liquid surface and located adjacent the wall of the mixing tank or vessel is critical to providing efficient mixing, i.e., controlled vortex formation and good buoyant particle mixing. A central draft tube may be employed in connection with the baffle design for additional enhancement of mixing. Partial baffles according to the present invention may include using small rectangular or triangular finger baffles which are located at various positions in the mixing tank. For constant level tank the baffles are secured at spaced locations about the tank wall inner surface and preferably are located just below the predetermined liquid surface level. The lower the location of the baffles the higher the mixer speed required for obtaining adequate mixing, which will result in a corresponding increase in mixing energy dissipated. For a variable level mixing tank the baffles are suitable attached to, for example, the underside of a floating ring which is restrained from rotation and, therefore, always will be properly positioned relative to the varying liquid level in the tank. The expedient of employing a draft tube above the impeller or agitator in the tank together with the aforesaid baffle arrangement for a constant level tank, provides a particularly good mixing result because it allows operation at lower mixer speeds and thus lower power consumption.

Another baffle configuration for variable level mixing tanks utilizes fixed baffles in the form of narrow elongated rectangles located adjacent to the tank wall and extending from the maximum operating liquid level to the bottom of the tank.

In order to have good mixing it is required to mix the large particles and maintain at the outlet a substantially uniform slurry concentration. No particles should remain stagnant on the liquid surface and the outlet slurry concentration should not vary significantly with changes in tank liquid level. However, total correspondence between the outlet concentration and bulk composition (i.e. the outlet concentration can be consistently somewhat less than the bulk concentration) is not essential and for the most part is not necessary.

It has been found that a controlling factor in mixing of any size or density of buoyant particle is the presence of a relatively narrow vortex such that the particles when drawn into the mouth of the vortex will be entrained and mixed. Thus, it is essential that there be established a flow pattern in the tank liquid which results in the vortex formation which then makes the mixing results relatively insensitive to buoyant particle properties. Large particles (for example, 1–3 inches in maximum dimension) mix equally well as small (less than ⅛ inch in maximum dimension). Vortex formation and tank velocities are generally related to the speed of the tip of the turbine agitator blade. Further details on the mixing principles and their applications can be obtained by reference to the text, *Mixing Principles and Applications* by S. Nagata (Halsted Press, 1975).

The partially baffled configurations of the present invention have been shown to consume less mixing power than fully baffled configurations, whch is attributable both to the reduction in the required mixer speed and baffle width. These are all conventional known relationships which can be readily developed by those skilled in the art to which the invention relates.

DESCRIPTION OF THE PREFERRED EMBODIMENTS

Figure 1:
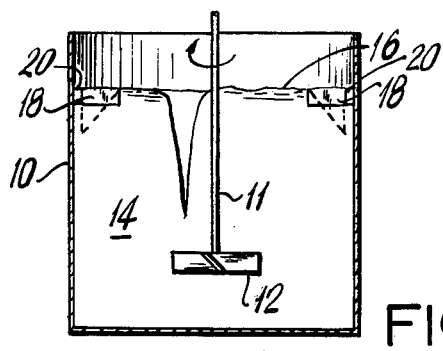
FIG. 1 is a schematic of finger baffles according to the present invention secured to the tank wall substantially at or just below the liquid level surface of a constant level tank, employing a single downpumping pitched blade turbine agitator.
Figure 2:
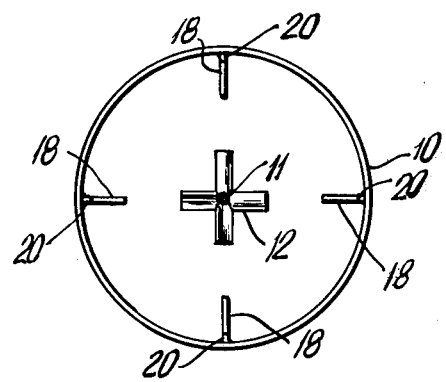
FIG. 2 is a top view of the configuration of FIG. 1.

Referring now to the drawings wherein the same parts are designated by the same reference numeral throughout the several views, there is shown in FIG. 1 a mixing tank or vessel 10 of the constant level type, i.e. where the liquid level in the tank is maintained at the same level at all times. The tank includes a vertically oriented shaft 11 which holds a centrally disposed agitator 12 which comprises a standard pitched blade turbine for example, a turbine having an overall diameter of ⅓ of tank diameter for downpumping with the blade pitch shown which is rotatably driven in a clockwise direction (although counter-clockwise movement also is possible with an opposite blade pitch by a motor or the like (not shown). Liquid 14 is generally kept at a constant level 16 and the mixing baffles 18 are secured to the inner surface of the tank shown just below the liquid surface, although they can be substantially at the surface of the liquid. The baffles are spaced 90° from one another as best shown in FIG. 2, about the inner surface of tank wall and are secured by conventional means 20 (e.g. brackets welded to the baffle and tank wall) to the tank wall. The baffles 18 can have a triangular configuration shown by the dotted lines in FIG. 1 or they can be of rectangular shape. In a typical operation which can be verified through testing by those skilled in the art, it has been shown that this type of baffle design will achieve efficient particle mixing at lower turbine agitator speeds than conventional full baffling or no baffling. For example in a 3 ft. diameter mixing tank and while using a 12 inch diameter pitched blade turbine, when the tank liquid level is substantially equal to the tank diameter, triangular baffles required a turbine speed of 150 rpm's for mixing with, for example, one-inch diameter polypropylene spheres in water. Full baffling and no baffling have been shown to require over 300 rpm's which is the maximum speed of the turbine. While triangular baffles are preferred for providing the most efficient mixing, the rectangular baffles will provide efficient mixing but to a slightly lesser degree. Typical dimensions for triangular baffles in a 3 ft. diameter mixing tank would be 4 by 6 inches with the long side being secured to the tank wall. It should be recognized, however, that various other sizes and shapes in addition to triangular and rectangular will be suitable for purposes of the present invention. Also the number of baffles employed may vary and while a minimum of two baffles are required and four are preferred, it also is possible to employ up to a maximum of eight baffles. Typically the baffles are oriented perpendicular to the wall of the tank. However, angled orientations are also suitable for purposes of the present invention.

If four triangular baffles are used, the size of each can be determined providing a horizontal leg which equals 10 to 15% of tank diameter and a vertical leg which equals 15 to 20% of tank diameter. If rectangular or other than four baffles are used, the size of each baffle is selected so that the sum of the surface areas of the baffles is the same as the total surface area for four baffles as sized above. The baffles are substantially evenly spaced around the circumference of the tank. The baffles are attached touching (directly in contact with) the tank wall or up to 2% of tank diameter away from the tank wall depending upon application and the sizes of particles to be mixed.

Figure 3:
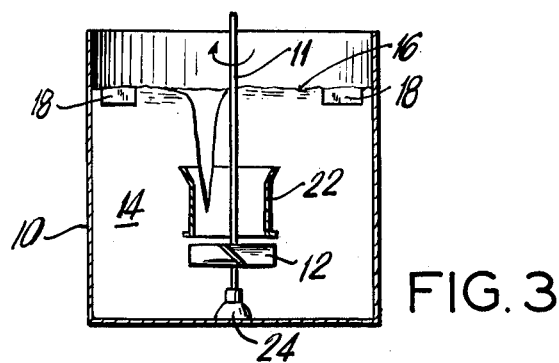
FIG. 3 is a schematic of the baffle configuration of FIGS. 1 and 2 with a centrally disposed draft tube.

FIG. 3 illustrates a mixing system incorporating a baffle design like that of FIGS. 1 and 2, additionally may include a central draft tube 22 situated above the turbine agitator 12 (the agitator drive is centrally disposed thereof), which coacts with the baffles 18 to provide reduced or lower power consumption than when employing only a draft tube without baffles. This reduced energy consumption is obtained because superior mixing is obtained while employing decreased turbine speeds as indicated by the following comparison. For mixing one-inch polypropylene spheres in a 3 foot diameter tank while using a 12 inch diameter pitched blade turbine this design requires a turbine speed of only 85 rpm's, while using a draft tube alone (no baffles) will require 150 rpm's, and full baffling or no baffles (with no draft tube) will require about 300 rpm's. An additional advantage of employing the baffles just below or substantially at the liquid surface is that they eliminate large surface waves which otherwise form in non-baffled tanks.

While the turbine agitator blade 12 shown is one type of turbine blade various others can be employed for purposes of this invention, depending upon the effect of mixing desired. At the bottom is a bottom or lower bearing 24 for steadily mounting the agitator blade.

Figure 4:
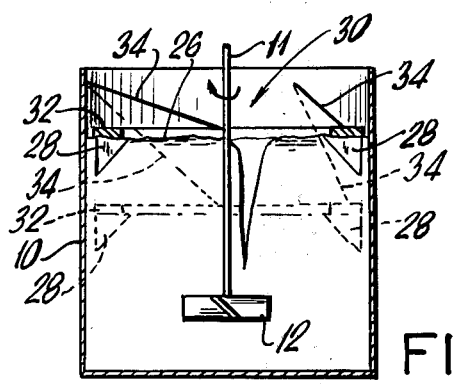
FIG. 4 is a schematic of finger baffles according to the present invention substantially at or just below the liquid level surface of a variable level tank.
Figure 5:
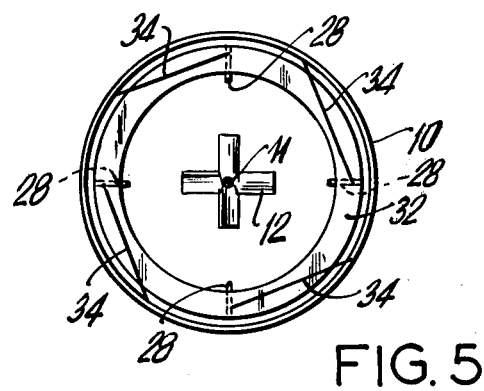
FIG. 5 is a top view of the configuration of FIG. 4.

FIGS. 4 and 5 show a baffle design for a variable level agitated tank 10, wherein the liquid level 26 is constantly changing. This necessitates that the baffles 28 (shown as triangular) actually always be situated just below or substantially at the liquid level. To accomplish this there is provided as illustrated in FIG. 4, a plurality of baffles 28 similar to those discussed thereinbefore in connection with the other embodiments; however, they are mounted to a tethered floating ring generally designated 30 which includes an annular floating member 32 having tethers 34 connected between the ring 32 and fixed at points on the inner tank wall surface. They are arranged to have long scope and approach a horizontal orientation when the liquid level in the tank is very high and a vertical orientation when the liquid level is low. For example, in a three-foot diameter mixing tank the member might comprise a one-half inch thick plywood annular ring having an overall diameter sized to just fit loosely in the tank and of a radial width, for example, of two inches. The baffles 28 would be made from sheet metal and secured on the underside of the ring by conventional means (e.g. screws), and would be perpendicularly disposed to the ring 32 and the tank wall. Tests have shown that with a tank liquid level equal to tank diameter baffles of a triangular type held by the float as shown, will enable the mixing of one-inch diameter polypropylene spheres at turbine speeds of only 150 rpm's while both full baffles and no baffles require over 300 rpm's.

Figure 6:
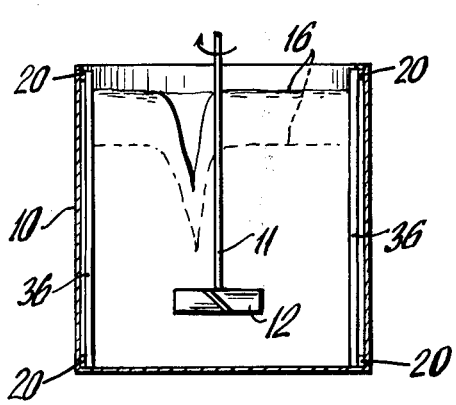
FIG. 6 is a schematic of full length partial baffles according to the present invention.
Figure 7:
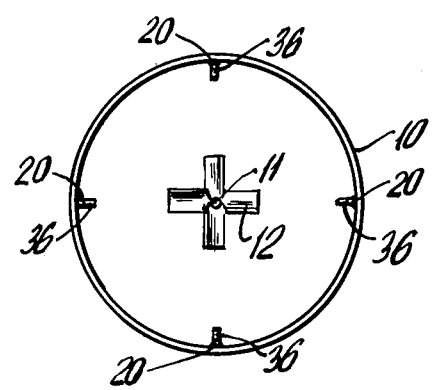
FIG. 7 is a top view of the configuration of FIG. 6.

Although the preferred baffles arrangement for a variable level tank is the arrangement which always positions the baffles just below or substantially at the liquid level as disclosed above, another embodiment consists of the fixed position partial baffle illustrated in FIGS. 6 and 7. These baffles 36 take the form of elongated rectangles covering the full depth of liquid in the tank and are spaced equally about the inner tank surfaces. If four baffles are used, the size of the rectangles in the radial direction (width) should be approximately 2% of the tank diameter. In a 3 foot diameter mixing tank while using a 12 inch diameter pitch blade turbine such elongated baffles require a turbine speed of 175 rpm for mixing one-inch polypropylene spheres in water. Typically the elongated baffles are oriented perpendicular to the wall of the tank as well as being substantially vertical. However, angled orientation to the tank wall is suitable if the projected size in the radial direction corresponds to the above relationship. Orientations up to 15 degrees from non-vertical also are suitable for the purpose of the present invention. Additionally the number of baffles employed may be varied if a counteracting change in radial width is made. Departures from a regular rectangular shape for the baffles such as tapers or serrations also are possible and within the present invention.

Additionally, the present invention employs only a single turbine agitator, whereas previously used fully baffled configurations employed multiple agitators with their consequent multiplied power consumption.

It has been established that partially baffled configurations according to the present invention consume less mixing power than fully baffled configurations. This can be attributed to a reduction in the required mixer speed and also a reduction in the turbine power number Np which is used here as conventionally defined in the mixing literature. The power number and mixing power requirements are related to mixer size, speed, and system physical properties by the known equation $$p = N_p \, p N^3 D^5 / k_p$$

wherein P is the power consumed in watts (hp); Np is the dimensionless power number; e is the slurry density in $Kg/M^3$ ($lb/ft.^3$); N is the turbine rotational speed in revs; D is the turbine diameter in meters; (ft.) and kp is a unit conversion constant which is 1.0 for metric units and 17,700 for customary units.

Other factors which would enter into the established design are the elevation of the turbine above the bottom of the tank, the maximum slurry level to be accommodated, and the location of the withdrawal outlet for the mixed slurry and the slurry velocity through this outlet.

There has been described and illustrated herein a novel mixing system for efficient mixing of buoyant particle slurries wherein particles are less dense than the carrying liquid, which not only mix large buoyant particles but achieve such mixing with a consumption of less mixing power than heretofore obtainable. The foregoing embodiments of the invention are by way of illustration only and numerous alterations of the structure herein disclosed will suggest themselves to those skilled in the art without departing from the spirit thereof, for which reference is made to the appended claims.

What is claimed is:

1. A mixing system for buoyant particle slurry comprising: a tank for containing said slurry; liquid agitator means disposed within said tank including an agitator blade located substantially near the bottom thereof; baffle means comprising a plurality of baffles for continuously aiding in the mixing of said slurry situated only substantially in the vicinity of the slurry liquid level in said tank at a given instant of time and situated adjacent the wall of said tank.

2. The mixing system of claim 1 wherein said baffles are fixedly secured to said tank wall.

3. The mixing system of claim 1 wherein said baffles are constructed and arranged for movement substantially commensurate with changes in the liquid level of said slurry in said tank.

4. The mixing system of claim 1 wherein said baffles are substantially equally spaced about the wall of said tank.

5. The mixing system of claim 1 wherein each of said baffles has a triangular configuration and is disposed substantially perpendicular relative to the tank wall.

6. The mixing system of claim 1 wherein each of said baffles has a rectangular configuration and is disposed substantially perpendicular to the wall of said tank.

7. The mixing system of claim 1 including a draft tube disposed above said agitator blade extending vertically upward for a predetermined distance for cooperation with said baffles to effectively mix said buoyant particles.

8. The mixing system of claim 1 wherein said baffles are disposed directly adjacent and below the surface of said liquid level in said tank.

9. The mixing system of claim 1 wherein the only mixing means for said liquid comprises said agitator means and said baffles situated adjacent and just below the surface of said liquid level in said tank.

10. The mixing system of claim 1 including means floating at the surface of said slurry and supporting said baffle for movement responsive to changes in the level of said slurry; and means for preventing substantial rotation of said baffle in said tank.

11. The mixing system of claim 1 wherein the liquid agitator means comprises a single pitched blade turbine.

12. A mixing system for buoyant particle slurry comprising: a tank for containing said slurry; liquid agitator means disposed within said tank including an agitator blade located substantially near the bottom thereof; baffle means comprising of baffles for continuously assisting in the mixing of said slurry situated adjacent the wall of said tank, all of said baffles extending from substantially in the vicinity of the slurry liquid level to at least adjacent the bottom of said tank, said baffles each having a substantially rectangular configuration and a radial width not greater than two percent of the diameter of said tank.

13. The mixing system of claim 12 including a plurality of equally spaced baffles about the wall of said tank.

14. The mixing system of claim 4 wherein said baffles are disposed at an angle orientation relative to the tank wall.

15. The mixing system of claim 1 wherein each of said baffles having a triangular configuration and each of said baffles has a horizontal leg equal to about 10 to 15% of the tank diameter and a vertical leg equal to about 15 to 20% of said tank diameter.

16. The mixing system of claim 1 wherein each of said baffles is directly affixed to said tank wall.

17. The mixing system of claim 1 wherein each of said baffles is spaced from said tank wall at a maximum of 2% of the tank diameter.

18. A mixing system for buoyant particle slurry comprising: a tank for containing said slurry; liquid agitator means disposed in said tank including an agitator blade located substantially near the bottom thereof; baffle means comprising plurality of baffles for continuously assisting in the mixing of said slurry situated at least in the vicinity of the maximum slurry liquid level in said tank and adjacent the wall of said tank, the total surface area of said baffles being substantially equal to the surface area provided by four triangular baffles each having a horizontal leg equal to about 10 to 15% of the tank diameter and a vertical leg equal to about 15 to 20% of the tank diameter.

19. The mixing system of claim 18 wherein said baffles extend down to at least adjacent the bottom of said tank.

* * * * *